United States Patent [19]
Drozd

[11] Patent Number: 4,776,368
[45] Date of Patent: Oct. 11, 1988

[54] FLUID PRESSURE REGULATOR

[75] Inventor: Mitchell M. Drozd, Harwood Heights, Ill.

[73] Assignee: Binks Manufacturing Company, Franklin Park, Ill.

[21] Appl. No.: 25,577

[22] Filed: Mar. 13, 1987

[51] Int. Cl.⁴ ............................................. F16K 31/365
[52] U.S. Cl. ........................... 137/505.43; 137/505.41; 137/505.22; 137/557; 92/103 SD; 251/368
[58] Field of Search ........... 137/116.5, 505.22, 505.38, 137/505.41, 505.42, 505.43, 551, 557; 92/103 SD; 251/368

[56] References Cited

U.S. PATENT DOCUMENTS

| | | | |
|---|---|---|---|
| 1,946,188 | 2/1934 | Birch | 137/505.41 X |
| 2,147,850 | 2/1939 | MacLean | 137/505.41 X |
| 2,702,561 | 2/1955 | Geffroy | 137/505.42 X |
| 2,707,966 | 5/1955 | Taplin | 137/116.5 |
| 2,770,441 | 11/1956 | Grove | 137/505.42 X |
| 2,806,481 | 9/1957 | Faust | 137/505.42 X |
| 2,898,418 | 8/1959 | Byam | 92/103 SD X |
| 2,899,972 | 8/1959 | Matthews | 137/505.41 X |
| 3,386,458 | 6/1968 | Wasserman et al. | 137/505.41 X |
| 3,661,060 | 5/1972 | Bowen | 92/103 SD X |
| 3,982,559 | 9/1976 | Ochs | 92/103 SD X |

FOREIGN PATENT DOCUMENTS 629144 11/1927 France .................. 137/505.43

*Primary Examiner*—John Rivell
*Attorney, Agent, or Firm*—Juettner Pyle Lloyd & Verbeck

[57] ABSTRACT

A fluid pressure regulator, for controlling the pressure of fluid in accordance with the pressure of an air signal, is characterized by a housing having a chamber divided into fluid and air chambers by at least two flexible diaphragms. The fluid chamber has a valved inlet for connection with a supply of fluid at an elevated pressure, and an outlet. The air chamber has an inlet for receiving an air signal at a selected pressure. A valve is moved by flexure of the diaphragms to open and close the fluid inlet, so that the pressure of the air signal regulates the pressure of fluid in the fluid chamber and at its outlet. A space is defined between the diaphragms, and vents extend from the space to exterior of the housing. Should the diaphragm on the fluid compartment side rupture, fluid entering the space will flow through the vents and provide a visible indication of diaphragm failure, but the diaphragm on the air chamber side will prevent fluid from entering that chamber. Should the diaphragm on the air chamber side rupture, air entering the space will flow through the vents and cause a whistling sound so audibly indicate diaphragm failure, but the diaphragm on the fluid chamber side will prevent fluid from entering the air chamber. If used to regulate the pressure of liquid coating material in an electrostatic spray coating system, the structure of the pressure regulator prevents it from storing a potentially dangerous electrical charge.

4 Claims, 1 Drawing Sheet

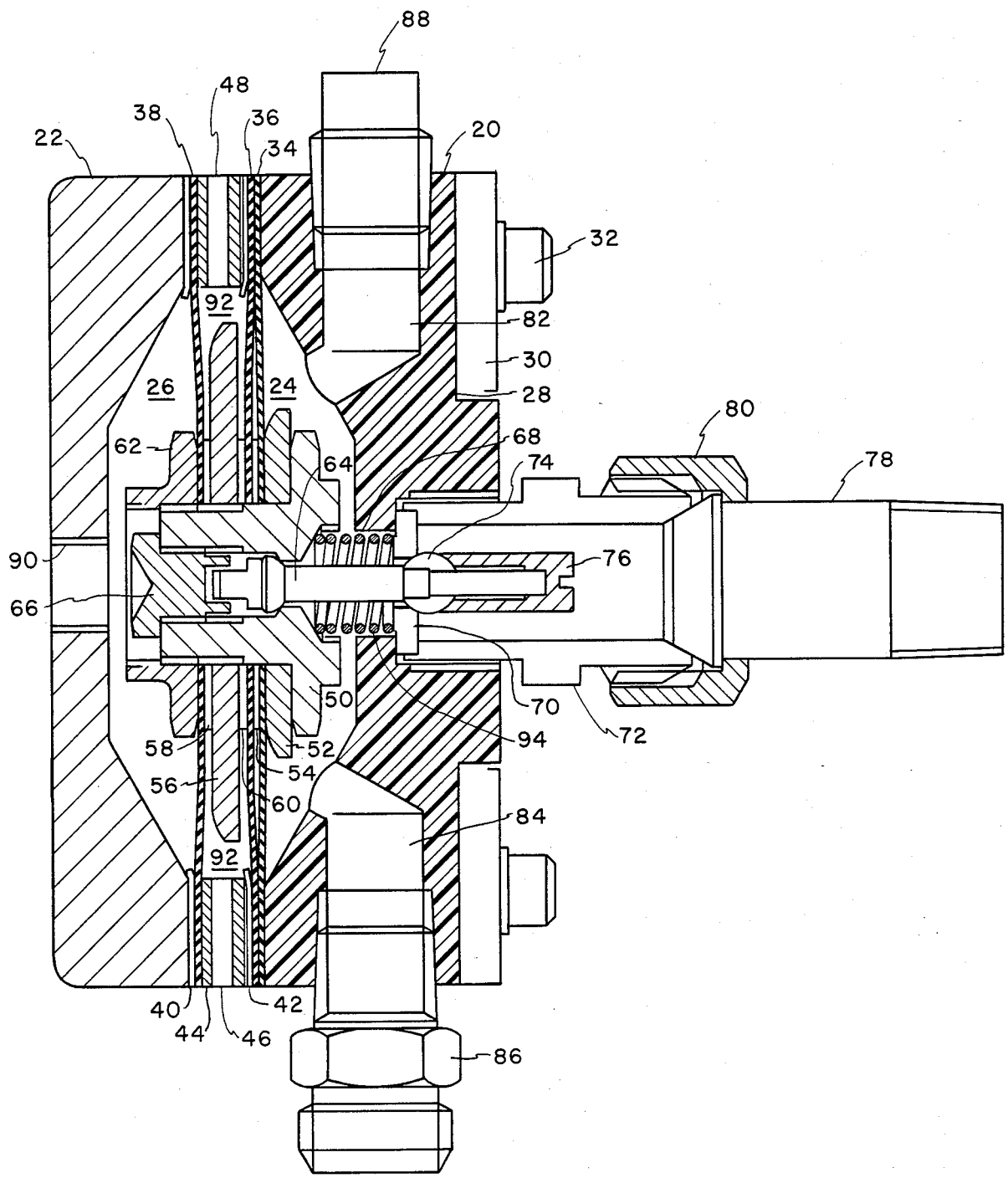

FLUID PRESSURE REGULATOR

BACKGROUND OF THE INVENTION

The present invention relates to fluid pressure regulators in general, and in particular to an improved fluid pressure regulator, that has at least two internal diaphragms to protect against harm from diaphragm failure.

Fluid pressure regulators find use in many industrial applications where the pressure of fluid supplied to a point of use must be regulated. Such regulators conventionally comprise a housing, in which a chamber is defined. A single diaphragm divides the chamber into two separate chambers, each in fluid sealed relationship from the other. One of the chambers receives fluid through a valved inlet connected to an external supply of fluid at an elevated pressure, and the fluid exits the chamber through an outlet. The other chamber may have an inlet for connection with an air signal at a predetermined pressure, and the fluid inlet valve connects with the diaphragm for being opened and closed in response to flexure of the diaphragm. Upon application of an air signal at the air chamber inlet, flexure of the diaphragm, in response to the opposing pressures of air and fluid in the chambers on opposite sides of the diaphragm, causes opening and closing of the valved inlet, in a manner to bring the fluid at the outlet to a pressure determined by the pressure of the air signal.

Such fluid pressure regulators often are used in industrial spray coating operations, where the pressure of paint or other material supplied to spray coating apparatus must be carefully controlled. For automatic spray coating operations, particularly where different colors of coating materials are sequentially supplied to the spraying apparatus, the pressure of the air signal usually is controlled by an electronic transducer. Color changing requires that the paint supply system, including the pressure regulator, be flushed with solvent between color changes, to clean it of one color of paint in preparation for supplying another. However, exposure to paint and solvent degrades and weakens the bellows of the pressure regulator, and repetitive cycling of the pressure regulator, during color changes, further weakens the bellows. Ultimately, the bellows may rupture and establish a path between the paint and air chambers, allowing paint and/or solvent to flow into the air chamber and through the air signal line to the electronic transducer. The result is destruction of the transducer and, if the paint and/or solvent are inflammable, creation of a fire and explosion hazard.

OBJECTS OF THE INVENTION

An object of the present invention is to provide an improved fluid pressure regulator, which has at least two diaphragms separating fluid and air chambers of the regulator, so that should one of the diaphragms rupture, a seal will continue to be maintained between the chambers.

Another object is to provide such a pressure regulator which, upon failure of a diaphragm, gives either an audible or visible warning of the failure.

A further object is to provide a pressure regulator which, when used with an electrostatic spray coating system, is not capable or storing a potentially dangerous electrical charge.

Yet another object is to provide a pressure regulator, that is structured to compensate for diaphragm stretching and for use with an air control system that has a minimum air pressure threshold level.

SUMMARY OF THE INVENTION

In accordance with the present invention, an improved fluid pressure regulator comprises housing means having a chamber therein, and flexible diaphragm means separating the chamber into air and fluid chambers. The housing means has a fluid inlet to the fluid chamber, for connection with a supply of fluid at an elevated pressure, a fluid outlet from the chamber, and an air inlet to the air chamber, for connection with a source of air under pressure. Valve means coupled with the diaphragm means and fluid inlet controls a flow path through the fluid inlet in accordance with flexure of the diaphragm means in response to opposing pressures of air and fluid in the air and fluid chambers, so that the pressure of fluid in the fluid chamber is in predetermined relationship to the pressure of air in the air chamber. The improvement is characterized in that the flexible diaphragm means comprises first and second flexible diaphragms extending across the chamber to separate the same into the air and fluid chambers.

In a preferred embodiment, the diaphragms are in spaced apart relationship and define a space therebetween, the first diaphragm is toward the air chamber, the second diaphragm is toward the fluid chamber, and the housing means has at least one vent passage extending into communication with the space. Consequently, should the first diaphragm rupture, air entering the space form the air chamber will exit through the at least one vent passage, causing an audible indication of failure of the first diaphragm, while the second diaphragm continues to separate the air and fluid chambers. On the other hand, should the second diaphragm rupture, fluid entering the space from the fluid chamber will exit through the at least one vent passage, causing a visible indication of failure of the second diaphragm, while the first diaphragm continues to separate the air and fluid chambers. The air and fluid chambers are therefore always maintained out of communication, even upon occurrence of diaphragm failure.

According to a further embodiment, the housing means comprises first and second housing portions that respectively define the air and fluid chambers therein. The first and second diaphragms are captured around their outer peripheries between outer peripheral surfaces of the first and second housing portions, and the diaphragms extend between and separate the housing portions, and, therefore, the air and fluid chambers. The diaphragms and second housing portion are of an electrically insulating material that is incapable of storing a potentially dangerous electrical charge, the first housing portion is of an electrically conductive material, and the valve means is out of contact with the first housing portion. Consequently, upon electrical grounding of the first housing portion, the fluid pressure regulator may be used to control the pressure of liquid coating material supplied to a high voltage electrostatic spray coating apparatus. without accumulation of a potentially dangerous electrical charge.

In another embodiment, that accommodates use of the fluid pressure regulator with an air control system that has a minimum air pressure threshold level, means are provided for urging the first and second diaphragms toward the air chamber with a selected force. For pressures of air in the air chamber less than sufficient to flex the diaphragms toward the fluid chamber against the selected force, the pressure of fluid in the fluid chamber remains substantially constant. However, for pressures of air in excess of that required to flex the diaphragms against the selected force, the pressure of fluid in the fluid chamber varies in predetermined relationship to the pressure of air in the air chamber.

The foregoing and other objects, advantages and features of the invention will become apparent upon a consideration of the folowing detailed description, when taken in conjunction with the accompanying drawings.

BRIEF DESCRIPTION OF THE DRAWING

The single drawing FIGURE is a cross sectional, side elevation view of a fluid pressure regulator, constructed according to the teachings of the invention.

DETAILED DESCRIPTION

The fluid pressure regulator of the invention includes a pair of generally circular housings forming an outer body of the regulator. The first is a housing 20 of an electrically insulating material, such as Delrin plastic, and the other is a housing 22 of an electrically conductive material, such as aluminum. Each has a centrally located recessed or relieved area, defining respective chambers 24 and 26 when the housings are joined together in face-to-face relationship. To secure the housings together, the housing 20 has an annular recess 28, in which is received an annular flange 30, and a plurality of cap screws 32 extend through the flange and housing into the housing 22.

Captured around their otuer peripheries, between facing annular surfaces of the housings 20 and 22, are three generally circular and flexible diaphragms 34, 36 and 38, a pair of annular gaskets 40 and 42, and an annular spacer 44 that has at least two radially extending vent passages 46 and 48. The spacer separates the periphery of the diaphragm 38 from the peripheries of the diaphragms 34 and 36, and the diaphragms are centrally apertured for reception of a retainer 50. Extended around an axial cylindrical portion of the retainer, and captured between a radial shoulder of the retainer and the diaphragm 34, is a disc 52. Also extended around the retainer, and separating the diaphragms 34 and 36, is an annular gasket 54. Intermediate the diaphragms 36 and 38 are an annular disc 56 and annular gaskets 58 and 60 on opposite sides of the disc. A nut 62, threaded onto the end of the retainer, captures between it and the radial flange the inner peripheral portions of the diaphragms 34, 36 and 38, along with the discs 52 and 56 and the gaskets 54, 58 and 60.

A valve rod 64 is carried at its rearward end within an axial passage through the retainer 50. A circumferential enlargement on the rearward end of the valve rod engages a radially inwardly extending shoulder in the retainer passage to prevent forward movement of the valve rod out of the passage, and a socket 66 threaded into the rearward end of the passage closes and seals the passage and prevents rearward movement of the valve rod out of the passage. The housing 20 has a fluid inlet 68 to the chamber 24, and the valve rod extends forwardly through the inelt and through a valve seat 70 held in the inlet by a tube 72 threaded into the inlet and against the valve seat. a generally spherical valve member 74 is around the valve rod outwardly of the valve seat, and is held in place by a cap nut 76 threaded onto the forward end of the valve rod. To provide fluid to the inlet, a supply line 78 is connected to the tube 72 by means of a swivel nut 80, and extends to a supply of fluid (not shown) at an elevated pressure.

In addition to the fluid inlet passage 68, the housing 20 also has a pair of fluid outlet passages 82 and 84. Threaded into the outlet 84 is a fitting 86 for connection with a line (not shown) leading to a point of delivery of fluid, for example to a spray coating apparatus (also not shown). The outlet 82 may similarly supply fluid to a point of use. Alternatively, a pressure gauge may be threaded into the outlet to measure the pressure of fluid or, as shown, the outlet may be closed by a plug 88. The housing 22 has only a single passage extending to the chamber 26, that being an inlet 90 for receiving an air signal at a pressure that maintains the fluid in the chamber 24 at a selected pressure, as will be described.

Each of the diaphragms, 34, 36 and 38 provides a liquid sealed barrier between the fluid chamber 24 and air chamber 26. The diaphragms 36 and 38 are spaced apart to define therebetween an annular space 92 in communication with the vent passages 46 and 48 extending through the spacer 44. For strength and flexibility, the diaphragms 36 and 38 may be of a Mylar material. If desired, and depending upon the nature of the fluid to be regulated, the diaphragms 36 and 38 could be used, by themselves, to separate the chambers 24 and 26. However, Mylar material is not extremely resistant to deterioration from exposure to paints and solvents. Consequently, if the fluid pressure regulator is used in a spray coating system or other application requiring handling of fluids that may deteriorate Mylar diaphragms, the diaphragm 34 advantageously is also used. The diaphragm 34 may be of a Teflon material, which is highly resistant to deterioration by paints and solvents, and although Teflon material is not as strong as Mylar material, because of the support provided by the diaphragm 36, absolute strength is not a requirement for the diaphragm 34.

In use of the fluid pressure regulator, and with a spring 94 extending between the retainer 50 and valve seat 70 to urge the retainer in a direction moving the valve member 74 against the seat to clsoe the fluid inlet, fluid at an elevated pressure is supplied to the inlet 68. An air signal is also applied to the inlet 90 to the air chamber 26, usually through a line leading to an electronic transducer (neither shown) for controlling the pressure of the air signal. The pressure of the air signal acts upon the diaphragm 38 to urge it rightwardly (as shown in the drawing) and move the valve member away from its seat. Upon opening of the valve, fluid flows through the inlet 68 into the chamber 24, and the pressure of the fluid acts on the diaphragm 34 to urge it leftwardly in a direction closing the valve. The pressure exerted by the fluid on the diaphragm 34 therefore opposes that exerted by the air on the diaphragm 38, and an equilibrium condition is reached when the pressure of fluid in the chamber 24 has a selected relationship to the pressure of air in the chamber 26.

If only a single diaphragm separated the chambers 24 and 26, should it rupture, fluid in the chamber 24 would flow into the chamber 26, and reversely through the inlet 90 to the air signal pressure controller. The result could be destruction of the controller and, if the fluid were an inflammable paint or solvent, the potential creation of a fire and explosion hazard.

Therefore, according to one aspect of the invention, multiple diaphragms separate the chambers 24 and 26. Should both of the diaphragms 34 and 36 rupture, either simultaneously or sequentially, fluid from the chamber 24 will enter the space 92, but the diaphragm 38 will prevent it from entering the chamber 26. Instead, the fluid will flow out of the space through one or both of the vent passages 46 and 48, thereby providing a visual indication of failure of and the need to replace the diaphragms 34 and 36, while the diaphragm 38 continues to sealingly separate the chambers. On the other hand, should the diaphragm 38 rupture, air from the chamber 26 will enter the space 92, but one or both of the diaphragms 34 and 36 will prevent fluid from flowing into the chamber 26. Instead, air will exit the space through the vent passages, causing generation of an audible indication of failure of the diaphragm 38, while one or both of the diaphragms 34 and 36 continue to separate the chambers. Consequently, upon diaphragm failure, an audible or visual warning will be generated, but the chambers 24 and 26 will remain separate.

According to another aspect of the invention, the fluid pressure regulator is adapted for use in an electrostatic spray coating system. In such systems, atomized spray particles are electrostatically charged, while the article to be coated is grounded, so that an increased percentage of spray particles are attracted to and deposited on the article. Electrostatic charging is accomplished by subjecting the fluid at the spraying device to a high, unidirectional, negative voltage, often on the order of 100KV or more. The high voltage is coupled to the column of liquid coating material supplied to the spray device, and because of conductivity of the fluid, the voltage is carried to components upstream from the spray device. Such components may therefore accumulate a dangerous electrical charge, and unless care is taken, may present a shock hazard to personnel or a danger of sparking and explosion in a highly inflammable environment.

The invention therefore also contemplates that the housing 20, along with the fluid inlet tube 72, swivel nut 80, fitting 86 and plug 88, be of an electrically insulating material, such as Delrin material and that the housing 22 be of an electrically conductive material, such as metal. When the pressure regulator is used in an electrostatic spray coating system, the housing 22 is electrically grounded. By virtue of the housing 20, inlet tube 72, swivel nut 80, fitting 86 and plug 88 being of an electrically insulating material, they are incapable of storing a potentially dangerous electrical charge, and since the housing 22 is grounded, the exterior of the pressure regulator is safe to touch and, at the same time, the pressure regulator cannot present a sparking and explosion hazard. Although the inner components of the pressure regulator, that mount centrally within the diaphragms, may be of a conductive material, they remain out of contact with the housing 22, so excess leakage of charging current to ground is avoided.

A third aspect of the invention contemplates provision of the spring 94. Normally, pressure regulators do not include a spring on the fluid side of a bellows. However, electronic transducers for controlling the pressure of an air signal often have an operational cut-off point below a minimum pressure of the air signal, for example below about 3 psi, and a somewhat nonlinear operation until the pressure of the air signal is somewhat above the cut-off point, such as about 0.4 psi above. The spring 94 is therefore selected to offset, or act evenly against, an air signal pressure of about 3.4 psi in the chamber 26, so that the fluid inlet valve is not opened until the air signal pressure is above about 3.4 psi, whereafter the pressure of fluid in the chamber 24 generally linearly follows the pressure of air in the chamber 26. Of course depending upon the nature of the control for the air signal, a spring of a different strength may be used, or it may not be necessary or advantageous to use a spring. However, an advantage to using the spring is that it compensates for diaphragm stretching due to use, so irrespective of the nature of the air signal controller, it may be desirable to use the spring.

While embodiments of the invention have been described in detail, various modifications and other embodiments thereof may be devised by one skilled in the art, without departing from the spirit and scope of the invention, as defined in the appended claims.

What is claimed is:

1. A fluid pressure regulator comprising housing means having a chamber therein; flexible diaphragm means having a chamber therein; flexible diaphragm means separating said chamber into an air chamber and a fluid chamber, said housing means having a fluid inlet to said fluid chamber for connection with a supply of fluid under pressure, a fluid outlet from said fluid chamber, and an air inlet to said air chamber, for connection with a source of air under pressure; and valve means coupled with said diaphragm means and said fluid inlet for controlling a flow path through said fluid inlet in accordance with flexure of said diaphragm means in response to the pressures of air and fluid in said air and fluid chambers, so that the pressure of fluid in said fluid chamber and at said fluid outlet is in predetermined relationship to the pressure of air in said air chamber, wherein said flexible diaphragm means comprises first and second flexible diaphragms extending across said chamber to separate the same into said air and fluid chambers and, wherein said housing means comprises first and second housing portions respectively defining said air and fluid chambers therein, said first and second diaphragms are captured around their outer peripheries between said first and second housing portions and extend between and separate said first and second housing portions and said air and fluid chambers, said diaphragms and said second housing portion are of an electrically insulating material that is incapable of storing a potentially dangerous electrical charge, said first housing portion is of an electrically conductive material, and said valve means is out of contact with said first housing portion, so that upon electrical grounding of said first housing portion, said fluid pressure regulator may be used to control the pressure of liquid coating material supplied to a high voltage electrostatic spray coating system without accumulation by said fluid pressure regulator of a potentially dangerous electrical charge.

2. A fluid pressure regulator as in claim 1, wherein said flexible diaphragm means includes a third flexible diaphragm of electrically nonconductive material adjacent said second diaphragm between said second diaphragm and said fluid chamber and captured around its outer periphery between said second diaphragm outer periphery and said second housing portion, said first and second diaphragms are in spaced apart relationship and define a space therebetween, and said housing means has at least one vent passage extending into communication with said space between said first and second diaphragms, so that should said first diaphragm rupture, air entering said space from said air chamber will exit through said at least one vent passage and cause an audible indication of failure of said first diaphragm, while at least one of said second and third diaphragms continues to separate said air and fluid chambers, and so that should said second and third diaphragms rupture, fluid entering said space from said fluid chamber will exit through said at least one vent passage and cause a visible indication of failure of said second and third diaphragms, while said first diaphragm continues to separate said air and fluid chambers.

3. A fluid pressure regulator as in claim 2, wherein said first and second diaphragms are of a relatively strong material that is resistant to rupture and said third diaphragm is of a mterial that is resistant to deterioration from exposure to fluid in said fluid chamber.

4. A fluid pressure regulator as in claim 3, wherein said first and second diaphragms are of Mylar material and said third diaphragm is of Teflon material

* * * * *